United States Patent
Dai et al.

(10) Patent No.: US 9,426,554 B2
(45) Date of Patent: Aug. 23, 2016

(54) HEADSET WITH MAGNETICALLY HOLDING FORCE BETWEEN HEADBAND AND MICROPHONE ARM

(71) Applicant: GN Netcom A/S, Ballerup (DK)

(72) Inventors: Daphi Dai, Ballerup (DK); Jeremy Wu, Ballerup (DK); Silas Zhang, Ballerup (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 14/754,477

(22) Filed: Jun. 29, 2015

(65) Prior Publication Data

US 2015/0382101 A1    Dec. 31, 2015

(30) Foreign Application Priority Data

Jun. 30, 2014    (CN) .......................... 2014 1 0307629

(51) Int. Cl.

| | |
|---|---|
| *H04R 1/08* | (2006.01) |
| *H04R 1/10* | (2006.01) |
| *H04M 1/60* | (2006.01) |
| *H04R 5/033* | (2006.01) |
| *H04M 1/03* | (2006.01) |

(52) U.S. Cl.
CPC ............ *H04R 1/083* (2013.01); *H04M 1/6058* (2013.01); *H04R 1/105* (2013.01); *H04R 1/1091* (2013.01); *H04M 1/03* (2013.01); *H04R 1/08* (2013.01); *H04R 1/1008* (2013.01); *H04R 5/0335* (2013.01); *H04R 2201/107* (2013.01)

(58) Field of Classification Search
CPC ...... H04R 1/083; H04R 1/105; H04R 1/1008; H04R 1/1066; H04R 5/0335
See application file for complete search history.

(56) References Cited

U.S. PATENT DOCUMENTS

| | | | |
|---|---|---|---|
| 2010/0040252 A1* | 2/2010 | Thompson ............. | H04R 1/083 381/375 |
| 2010/0310107 A1* | 12/2010 | Saila ....................... | H04M 1/05 381/363 |

FOREIGN PATENT DOCUMENTS

| | | |
|---|---|---|
| JP | 3557336 | 8/2004 |
| WO | WO 98/06233 | 2/1998 |

OTHER PUBLICATIONS

European Search Report dated Sep. 24, 2015 for European patent application No. 15168632.

* cited by examiner

*Primary Examiner* — Matthew Eason
(74) *Attorney, Agent, or Firm* — Altera Law Group, LLC

(57) ABSTRACT

This disclosure provides a headset comprising a first earphone with a first face facing the head of a user wearing the headset, a headband attached at a first end to the first earphone and a microphone arm rotatably attached to the first earphone. The microphone arm can rotate about a first axis essentially perpendicular to the first side, whereby the microphone arm can be rotated into to a rest position, where it extends along the headband. The headband comprises a first magnetic holding element and the microphone arm comprises at a co-operating second magnetic holding element, whereby the microphone arm can be magnetically adhered against the headband in the rest position.

11 Claims, 5 Drawing Sheets ical FIELD

HEADSET WITH MAGNETICALLY HOLDING FORCE BETWEEN HEADBAND AND MICROPHONE ARM

TECHNICAL FIELD

The invention relates to headset comprising a first earphone with a first face facing the head of a user wearing the headset, a headband attached at a first end to the first earphone and a microphone arm rotatably attached to the first earphone, whereby the microphone arm can rotate about a first axis essentially perpendicular to the first side, and whereby the microphone arm can be rotated into to a rest position, where it extends along the headband.

BACKGROUND ART

Headsets, headphones and earphones are used more and more by modern people at work and in spare time for telecommunication and music listening. Thus, more and more office workers spend time with unified communication over the Internet via f. ex. Microsoft Lync® and Skype®. To this purpose, headsets are used extensively. A headset is a head worn device comprising at least one speaker and a microphone in order to provide hands free telecommunication for a user wearing the headset. There exist many different types of headsets with different wearing styles, such as mono headsets with an ear hook and duo headsets with two earphones and a microphone arranged at the tip of a microphone arm. It has also become more and more common for people to listen to music while moving around in the society.

US 2010/0040252 discloses a headset comprising a first earphone, a headband and a microphone arm rotatably attached to the first earphone, whereby the microphone arm can rotate about a first axis essentially perpendicular to the head of a user wearing the headset, and whereby the microphone arm can be rotated into to a stowed position, in which the microphone arm is at least partially received in a recess defined in the headband.

The object of the invention is to provide a new and improved headset.

DISCLOSURE OF INVENTION

This disclosure provides a headset comprising a first earphone with a first face facing the head of a user wearing the headset, a headband attached at a first end to the first earphone and a microphone arm rotatably attached to the first earphone, whereby the microphone arm can rotate about a first axis essentially perpendicular to the first side, and whereby the microphone arm can be rotated into to a rest position, where it extends along the headband, wherein the headband comprises a first magnetic holding element and the microphone arm comprises at a co-operating second magnetic holding element, whereby the microphone arm can be magnetically adhered against the headband in the rest position. Thus, a user wearing the headset can easily and efficiently place the microphone in the rest position, when he only wants to listen to music, as the magnetic elements assists in placing the microphone arm in the rest position and maintain it here.

With the term "magnetic elements" is meant elements of materials, which can be magnetized or are strongly attracted to a magnet. In most cases, these materials are ferromagnetic. Ferromagnetic materials include iron, nickel, cobalt, some rare earth metals and some of their alloys. At least one of the magnetic elements must be a permanent magnet. Permanent magnets are made from "hard" ferromagnetic materials, which stay magnetized. "Soft" ferromagnetic materials like soft iron are attracted to a magnet but do not tend to stay magnetized.

According to an embodiment, the headband comprises a headband indentation for receiving a part of the microphone arm in the rest position.

The first magnetic element may be a metal strip provided at the bottom of the headband indentation.

Preferably, the indentation is adapted to confine rotational movement about the first axis of the microphone arm.

The headband indentation may comprise at least one side wall preventing rotation of the microphone arm about the first axis in at least one direction, when the microphone arm is in the rest position.

The headband indentation may also comprise side walls preventing rotation of the microphone arm about the first axis in both directions, when the microphone arm is in the rest position.

According to an embodiment, the microphone arm comprises a first arm part and a microphone head at the outer end, which microphone head has a larger cross section than the first arm part and is adapted to be at least partially received by the headband indentation in the rest position.

The microphone arm may be resilient in a first direction to and from the headband.

The microphone arm may be pliable in the first direction.

The headset may comprise a second earphone attached to a second end of the headband.

According to an embodiment, the first magnetic element or the second magnetic element comprises at least two permanent magnets.

BRIEF DESCRIPTION OF THE DRAWINGS

The invention is explained in detail below with reference to the drawing illustrating a preferred embodiment of the invention and in which.

MODES FOR CARRYING OUT THE INVENTION

Figure 1:
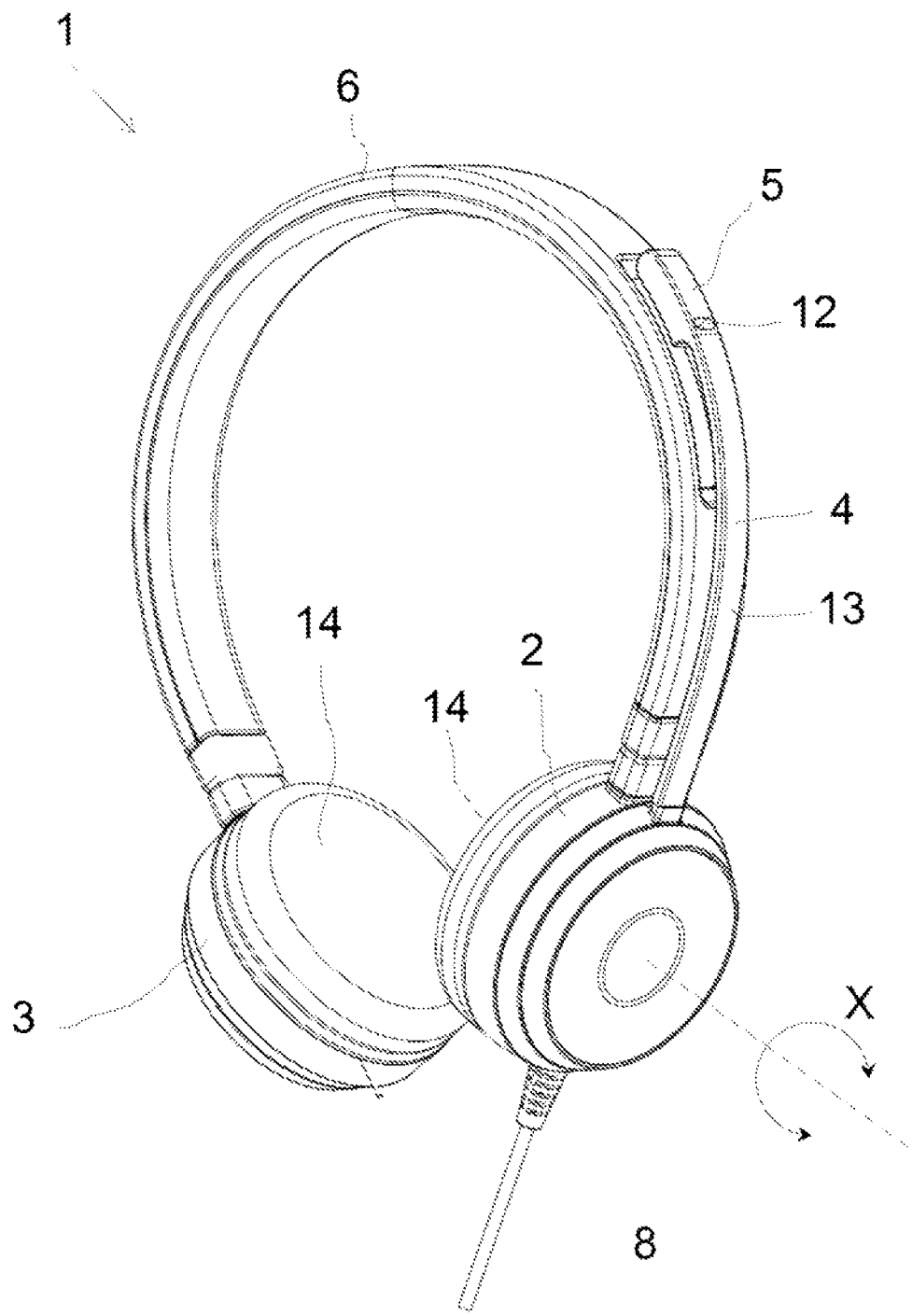
FIG. 1 is a perspective view of a preferred embodiment of headset according to the invention with the microphone arm in a rest position.
Figure 2:
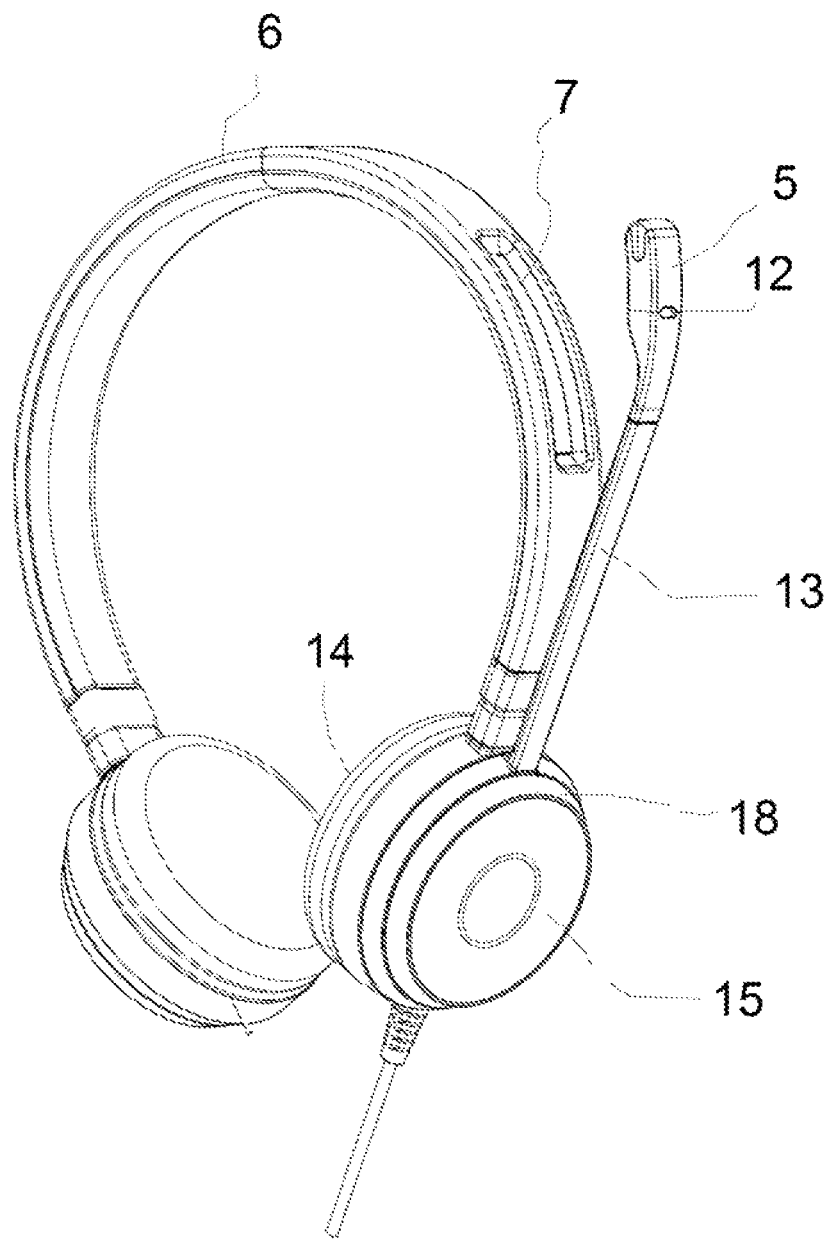
FIG. 2 is a perspective view of a the headset with the microphone arm in an intermediate position.
Figure 3:
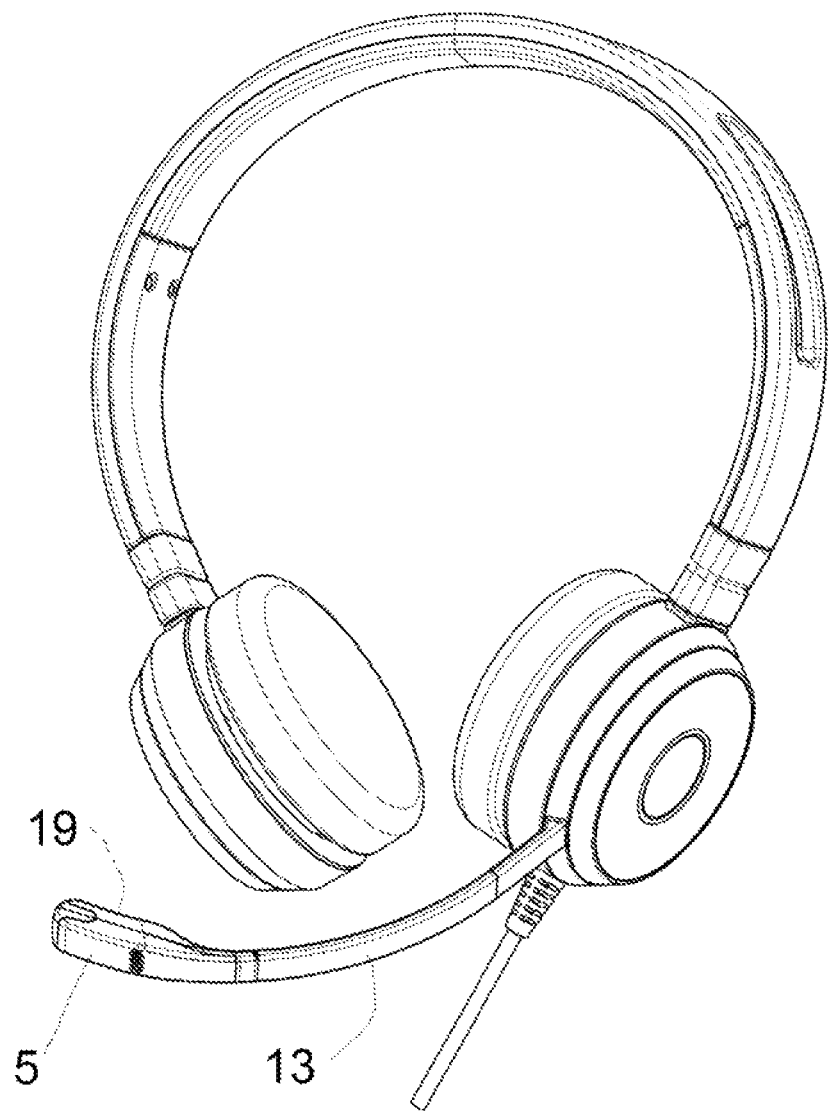
FIG. 3 is a perspective view of a the headset with the microphone arm in a speaking position.

FIGS. 1, 2 and 3 discloses a headset 1 according to an embodiment. The headset 1 comprises a first earphone 2, a second earphone 3, a headband 6 connecting the first and second earphones 2, 3, a cord 8 extending downwards from the first earphone 2 and a microphone arm 4 also extending from the first earphone 2. Each earphone 2, 3 comprises an inner face 14 facing the head of a user wearing the headset 1 and an outer face 15 opposite the inner face 14. The microphone arm 4 is integrated with an outer rotational part 18 at the outer face 15 of the first earphone 2, whereby it can rotate about an axis X through the centre of the first earphone 2 and orthogonal to the inner face 14 of the first earphone 2. Thus, the microphone arm 4 can rotate between a rest position as shown in FIG. 1 and a speaking position as shown in FIG. 3.

The microphone arm 4 comprises a first arm part 13, which extends from the rotational part 18, and a microphone head 5 at the outer end of the microphone arm 4. The microphone head 5 comprises a first set of sound openings 11 (see FIG. 5) on the inner side 19 of the microphone head 5 and a second set audio openings 12 on the outer side 20 of the microphone head 5. The first arm part 13 is made of resilient and pliable material, whereby it can be bent into a desired shape. This is can be seen when comparing FIGS. 1 and 2, where FIG. 2 discloses the first arm part 13 in a straight position and FIG. 1 in a curved position where the microphone arm 4 essentially follows the curvature of the headband 4.

Figure 4:
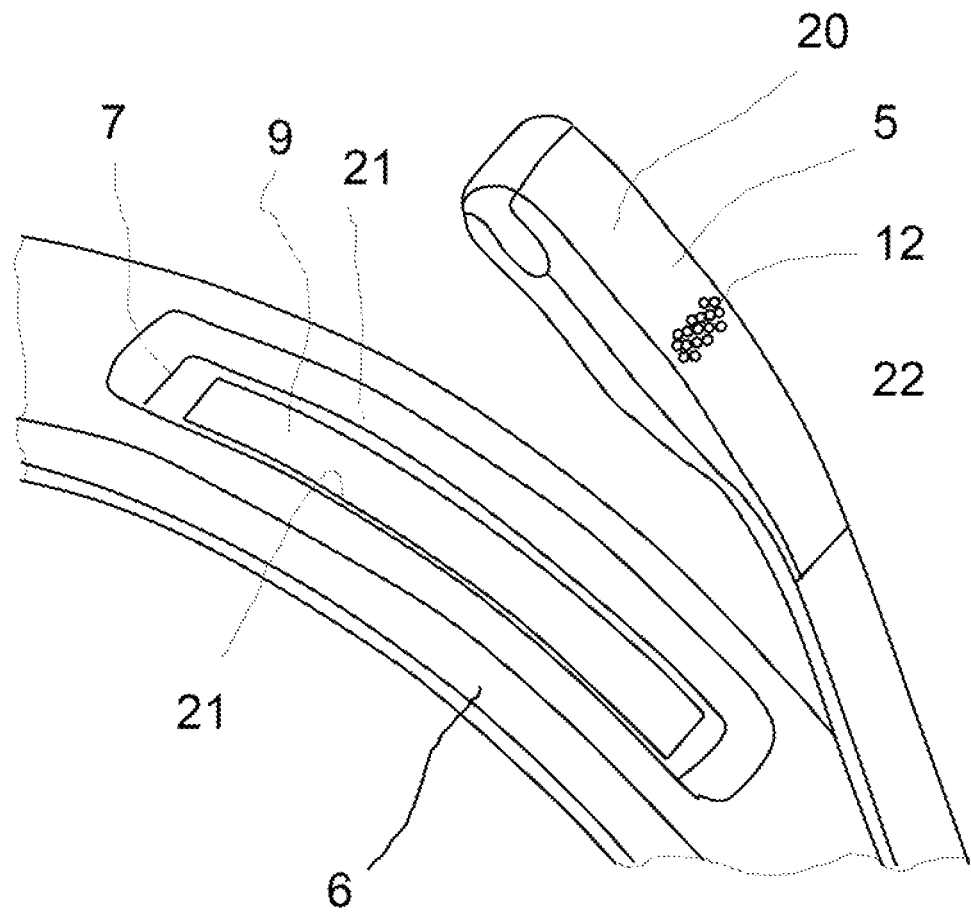
FIG. 4 is perspective view of details of the headband and the outer end microphone arm.
Figure 5:
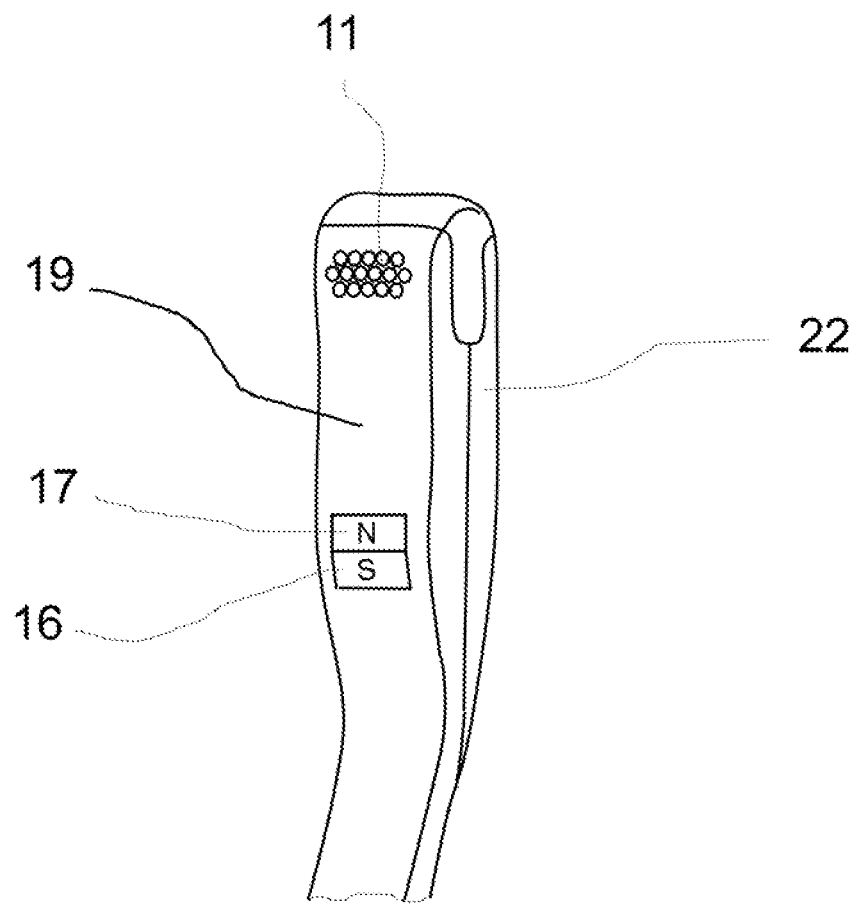
FIG. 5 is a perspective view of the outer end of the microphone arm.

As shown more in detail in FIG. 4, the headband 6 comprises a headband indentation 7 for receiving the microphone head 5, when the microphone arm 4 is in the rest position. In order to secure the microphone arm 4 in the rest position the indentation 7 and the microphone head 5 are provided with magnetic means. Thus, a ferromagnetic metal strip 9 is provided in the bottom of the indentation 7. As shown in FIG. 5, the inner side 19 of the microphone head 5 is provided with two permanent magnets 16, 17 arranged adjacent each other, whereby the south pole S of a first magnet 16 and the north pole N of a second magnet 17 faces the indentation 7. When the microphone arm 4 is bent close to the headband 6, the microphone head 5 will due to the magnetic forces between the metal strip 9 and the magnets 16, 17 be magnetically attached to the bottom of the indentation 7. If an external force is exerted on the microphone arm in its rotational direction, one of the indentation's 7 side walls 21 will abut the corresponding side wall 22 of the microphone head 5 and prevent further movement. Thus, the microphone arm 4 is secured in the rest position, whereby an undesired movement of the microphone arm 4 out of the rest position is prevented. However, if a user wearing the headset wants to move the microphone arm 4 from the rest position to a speaking position, he can simply grasp the outer end of the microphone arm 4 with two fingers, pull the microphone head 5 out of engagement with the indentation 7 and rotate it down to a position near the mouth.

The invention is not limited to the embodiment shown here.

REFERENCE SIGNS

1 headset
2 first earphone
3 second earphone
4 microphone arm
5 microphone head
6 headband
7 headband indentation
8 cord
9 metal strip (first magnetic element)
10 second magnetic element
11 first set of sound openings
12 second set of sound openings
13 first arm part
14 inner face of first earphone
15 outer face of first earphone
16 first magnet
17 second magnet
18 rotational part of first earphone
19 inner side of microphone head
20 outer side of microphone head
21 side wall of indentation
22 side wall of microphone head

The invention claimed is:

1. A headset comprising a first earphone with an inner face facing the head of a user wearing the headset, a headband attached at a first end to the first earphone, the headband having inner and outer surfaces, and a microphone arm rotatably attached to the first earphone, whereby the microphone arm is tangentially movable and rotatably attached so that it can rotate about a first axis essentially perpendicular to the outer face outside the headband, and whereby the microphone arm can be rotated into to a rest position, where it extends along the outer surface of the headband, wherein the headband comprises a first magnetic holding element and the microphone arm comprises at a co-operating second magnetic holding element, whereby the microphone arm can be magnetically adhered against the headband in the rest position.

2. A headset according to claim 1, wherein the outer surface of the headband comprises a headband indentation for receiving a part of the microphone arm in the rest position.

3. A headset according to claim 2, wherein the first magnetic element is a metal strip provided at the bottom of the headband indentation.

4. A headset according to claim 2, wherein the headband indentation is adapted to confine rotational movement about the first axis of the microphone arm.

5. A headset according to claim 4, wherein the headband indentation comprises at least one side wall preventing rotation of the microphone arm about the first axis in at least one direction, when the microphone arm is in the rest position.

6. A headset according to claim 5, wherein the headband indentation comprises side walls preventing rotation of the microphone arm about the first axis in both directions, when the microphone arm is in the rest position.

7. A headset according to claim 2, wherein the microphone arm comprises a first arm part and a microphone head at the outer end, which microphone head has a larger cross section than the first arm part and is adapted to be at least partially received by the headband indentation in the rest position.

8. A headset according to claim 1, wherein the microphone arm resilient in a first direction to and from the headband.

9. A headset according to claim 5, wherein the microphone arm is pliable in the first direction.

10. A headset according to claim 1, wherein the headset comprises a second earphone attached to a second end of the headband.

11. A headset according to claim 1, wherein the first magnetic holding element or the second magnetic holding element-comprises at least two permanent magnets.

\* \* \* \* \*